United States Patent
Sliwa et al.

(10) Patent No.: US 9,672,058 B2
(45) Date of Patent: Jun. 6, 2017

(54) REDUCED SERVICE PARTITION VIRTUALIZATION SYSTEM AND METHOD

(71) Applicants: Robert J Sliwa, Malvern, PA (US); John A Landis, Malvern, PA (US); Michael DiDomenico, Malvern, PA (US); Brittney Birchett, Malvern, PA (US)

(72) Inventors: Robert J Sliwa, Malvern, PA (US); John A Landis, Malvern, PA (US); Michael DiDomenico, Malvern, PA (US); Brittney Birchett, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 75 days.

(21) Appl. No.: 14/468,651

(22) Filed: Aug. 26, 2014

(65) Prior Publication Data

US 2015/0261559 A1    Sep. 17, 2015

Related U.S. Application Data

(60) Provisional application No. 61/952,252, filed on Mar. 13, 2014.

(51) Int. Cl.
G06F 9/455 (2006.01)
G06F 9/50 (2006.01)

(52) U.S. Cl.
CPC ........ G06F 9/45558 (2013.01); G06F 9/5077 (2013.01); G06F 2009/45575 (2013.01); G06F 2009/45583 (2013.01)

(58) Field of Classification Search
CPC .................................. G06F 9/45558
(Continued)

(56) References Cited

U.S. PATENT DOCUMENTS

| | | | | |
|---|---|---|---|---|
| 7,536,541 B2* | 5/2009 | Isaacson | ................ | G06F 9/441 713/1 |
| 8,561,065 B2* | 10/2013 | Cunningham | ...... | G06F 9/45558 718/1 |
| 2007/0028244 A1* | 2/2007 | Landis | .................. | G06F 9/5016 718/108 |

OTHER PUBLICATIONS

Wikipedia, "Unified Extensible Firmware Interface", Nov. 27, 2011, https://web.archive.org/web/20111127224725/http://en.wikipedia.org/wiki/Unified_Extensible_Firmware_Interface.*

* cited by examiner

*Primary Examiner* — Wei Zhen
*Assistant Examiner* — Lanny Ung
(74) *Attorney, Agent, or Firm* — Robert P. Marley

(57) ABSTRACT

A reduced service partition system and method for a host computing device having a host processor and system resources including memory divided into most privileged system memory and less privileged user memory. The system includes a virtualization boot application that operates in the less privileged user memory and divides the host computing device into a resource management partition, at least one virtual service partition and at least one virtual guest partition. The virtual guest partition provides a virtualization environment for at least one guest operating system. The virtual service partition provides a virtualization environment for the basic operations of the virtualization system. The resource management partition maintains a resource database for use in managing the use of the host processor and the system resources. A monitor operates in the most privileged system memory, and maintains guest applications in the at least one virtual guest partition within memory space allocated by the virtual service partition to the at least one virtual guest partition. A context switch between the at least one monitor and the respective virtual (Continued)

guest partitions and the virtual service partition controls multitask processing in the partitions on the at least one host processor.

23 Claims, 10 Drawing Sheets

(58) Field of Classification Search
USPC .............................................................. 718/1
See application file for complete search history.

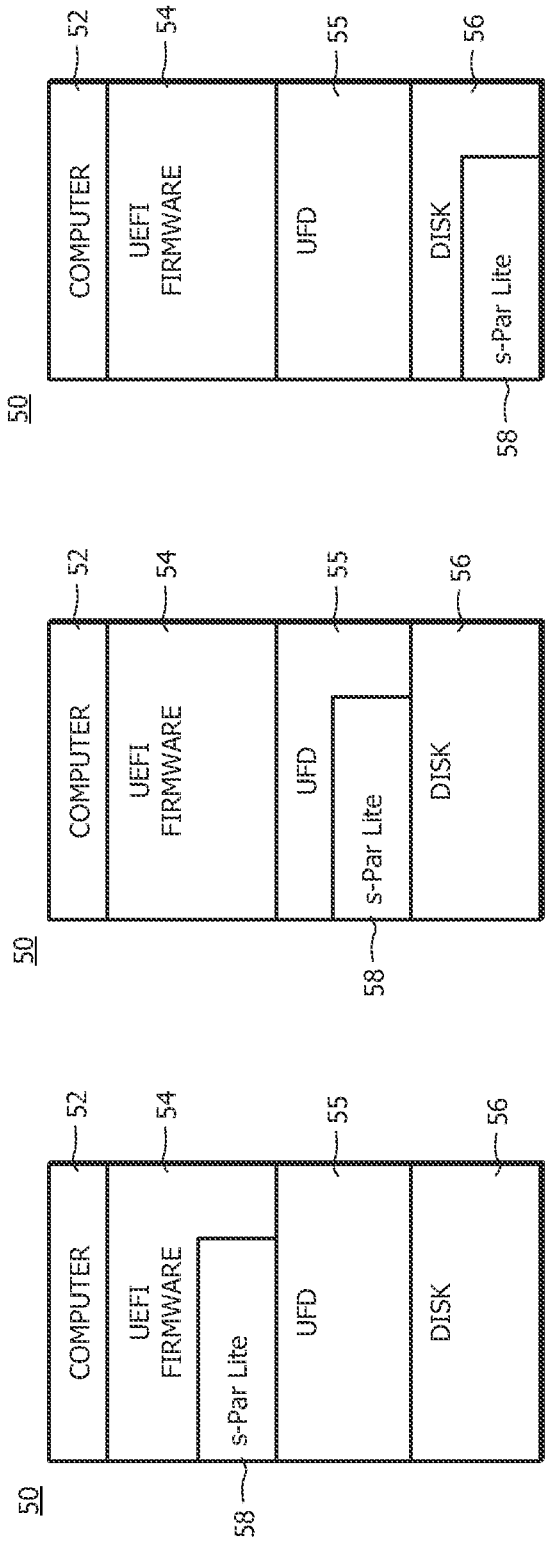

REDUCED SERVICE PARTITION VIRTUALIZATION SYSTEM AND METHOD

CROSS-REFERENCE TO RELATED APPLICATIONS

This application claims priority to U.S. Patent Application Ser. No. 61/952,252, filed Mar. 13, 2014, which is incorporated by reference in its entirety.

Educed Service partition patent application that operates in the less privileged user memory and divides the host computing device into a resource management partition, at least one virtual service partition and at least one virtual guest partition. The at least one virtual guest partition provides a virtualization environment for at least one guest operating system. The virtual service partition provides a virtualization environment for the basic operations of the virtualization system. The resource management partition maintains a resource database for use in managing the use of the at least one host processor and the system resources. The system also includes at least one monitor that operates in the most privileged system memory. The monitor maintains guest applications in the at least one virtual guest partition within memory space allocated by the virtual service partition to the at least one virtual guest partition. The system also includes a context switch between the at least one monitor and the respective virtual guest partitions and the virtual service partition. The context switch controls multi-task processing in the partitions on the at least one host processor.

BRIEF DESCRIPTION OF THE DRAWINGS

FIG. 5*a* is a schematic view of a computing device, in which the reduced service partition architecture is stored in the UEFI firmware of the computing device, according to an embodiment;

FIG. 5*b* is a schematic view of a computing device, in which the reduced service partition architecture is stored in the Universal Serial Bus (USB) Flash Drive (UFD) of the computing device, according to an embodiment;

FIG. 5*c* is a schematic view of a computing device, in which the reduced service partition architecture is stored in the disk space of the computing device, according to an embodiment;

DETAILED DESCRIPTION

Figure 1:
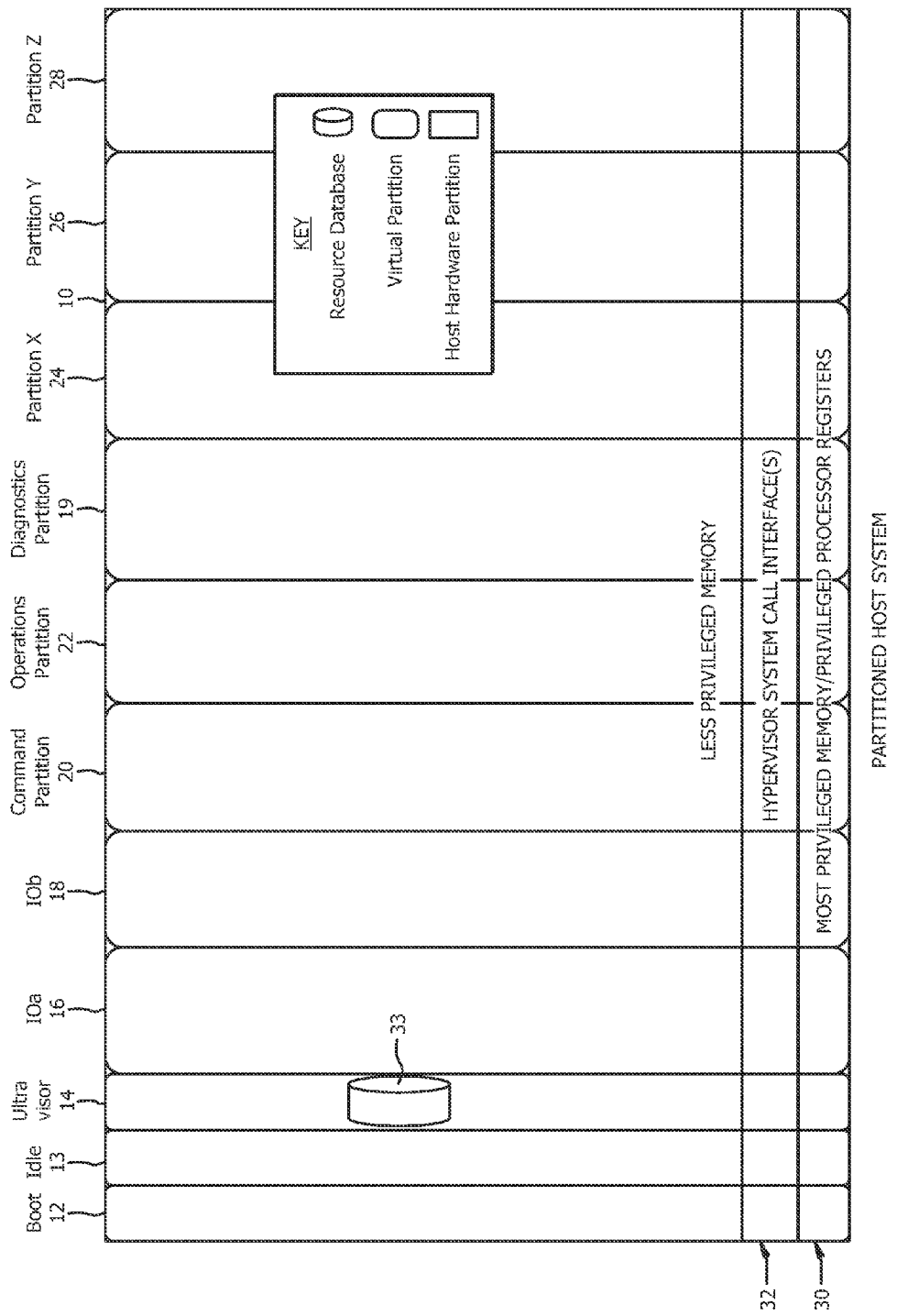
FIG. 1 is a schematic view of a host system partitioned using a para-virtualization system, illustrating system infrastructure partitions, according to an embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for providing a securely partitioned virtualization system having dedicated physical resources for each partition. In some examples a virtualization system has separate portions, referred to herein as monitors, used to manage access to various physical resources on which virtualized software is run. In some such examples, a correspondence between the physical resources available and the resources exposed to the virtualized software allows for control of particular features, such as recovery from errors, as well as minimization of overhead by minimizing the set of resources required to be tracked in memory when control of particular physical (native) resources "change hands" between virtualized software.

Those skilled in the art will appreciate that the virtualization design of the invention minimizes the impact of hardware or software failure anywhere in the system while also allowing for improved performance by permitting the hardware to be "touched" in certain circumstances, in particular, by recognizing a correspondence between hardware and virtualized resources. These and other performance aspects of the system of the invention will be appreciated by those skilled in the art from the following detailed description of the invention.

In the context of the present disclosure, virtualization software generally corresponds to software that executes natively on a computing system, through which non-native software can be executed by hosting that software with the virtualization software exposing those native resources in a way that is recognizable to the non-native software. By way of reference, non-native software, otherwise referred to herein as "virtualized software" or a "virtualized system", refers to software not natively executable on a particular hardware system, for example due to it being written for execution by a different type of microprocessor configured to execute a different native instruction set. In some of the examples discussed herein, the native software set can be the x86-32, x86-64, or IA64 instruction set from Intel Corporation of Sunnyvale, Calif., while the non-native or virtualized system might be compiled for execution on an OS2200 system from Unisys Corporation of Blue Bell, Pa. However, it is understood that the principles of the present disclosure are not thereby limited.

In general, and as further discussed below, the present disclosure provides virtualization infrastructure that allows multiple virtual guest partitions to run within a corresponding set of host hardware partitions. By judicious use of correspondence between hardware and software resources, it is recognized that the present disclosure allows for improved performance and reliability by dedicating hardware resources to that particular partition. When a partition requires service (e.g., in the event of an interrupt or other issues which indicate a requirement of service by virtualization software), overhead during context switching is largely avoided, since resources are not used by multiple partitions. When the partition fails, those resources associated with a partition may identify the system state of the partition to allow for recovery. Furthermore, due to a distributed architecture of the virtualization software as described herein, continuous operation of virtualized software can be accomplished.

FIG. 1 shows an example arrangement of a para-virtualization system that can be used to accomplish the features described herein. In some embodiments, the architecture discussed herein uses the principle of least privilege to run code at the lowest practical privilege. To do this, special infrastructure partitions run resource management and physical I/O device drivers. FIG. 1 illustrates system infrastructure partitions on the left and user guest partitions on the right. Host hardware resource management runs as an ultravisor application in a special ultravisor partition. This ultravisor application implements a server for a command channel to accept transactional requests for assignment of resources to partitions. The ultravisor application maintains the master in-memory database of the hardware resource allocations. The ultravisor application also provides a read only view of individual partitions to the associated partition monitors.

In FIG. 1, a partitioned host (hardware) system (or node) 10 has lesser privileged memory that is divided into distinct partitions, including special infrastructure partitions, such as a boot partition 12, an idle partition 13, a resource management "ultravisor" partition 14, a first input/output (I/O) virtual machine (IOVM) partition 16, a second IOVM partition 18, a command partition 20, an operations partition 22, and a diagnostics partition 19, as well as virtual guest partitions (e.g., a virtual guest partition X 24, a virtual guest partition Y 26, and a virtual guest partition Z 28). As illustrated, the partitions 12-28 do not access the underlying privileged memory and processor registers 30 directly, but instead accesses the privileged memory and processor registers 30 via a hypervisor system call interface 32 that provides context switches among the partitions 12-28, e.g., in a conventional manner. However, unlike conventional virtual machine monitors (VMMs) and hypervisors, the resource management functions of the partitioned host system 10 of FIG. 1 are implemented in the special infrastructure partitions 12-22.

Furthermore, rather than requiring the re-write of portions of the guest operating system, drivers can be provided in the guest operating system environments that can execute system calls. As explained in further detail in U.S. Pat. No. 7,984,104, assigned to Unisys Corporation of Blue Bell, Pa., these special infrastructure partitions 12-22 control resource management and physical I/O device drivers that are, in turn, used by operating systems operating as guests in the virtual guest partitions 24-28. Of course, many other virtual guest partitions may be implemented in a particular partitioned host system 10 in accordance with the techniques of the present disclosure.

A boot partition 12 contains the host boot firmware and functions to initially load the ultravisor partition 14, the IOVM partitions 16 and 18, and the command partition 20. Once launched, the ultravisor partition 14 includes minimal firmware that tracks resource usage using a tracking application referred to herein as an ultravisor or resource management application. Host resource management decisions are performed in the command partition 20, and distributed decisions among partitions in the host partitioned system 10 are managed by the operations partition 22. The diagnostics partition 19 is responsible for handling diagnostics logs and dumps.

The I/O to disk drive operations and similar I/O operations are controlled by one or both of the IOVM partitions 16 and 18 to provide both failover and load balancing capabilities. Operating systems in the virtual guest partitions 24, 26, and 28 communicate with the IOVM partitions 16 and 18 via memory channels (FIG. 3) established by the ultravisor partition 14. The partitions communicate only via the memory channels. Hardware I/O resources are allocated only to the IOVM partitions 16, 18. In the configuration of FIG. 1, the hypervisor system call interface 32 functions as a context switching and containment element (monitor) for the respective partitions.

Figure 2:
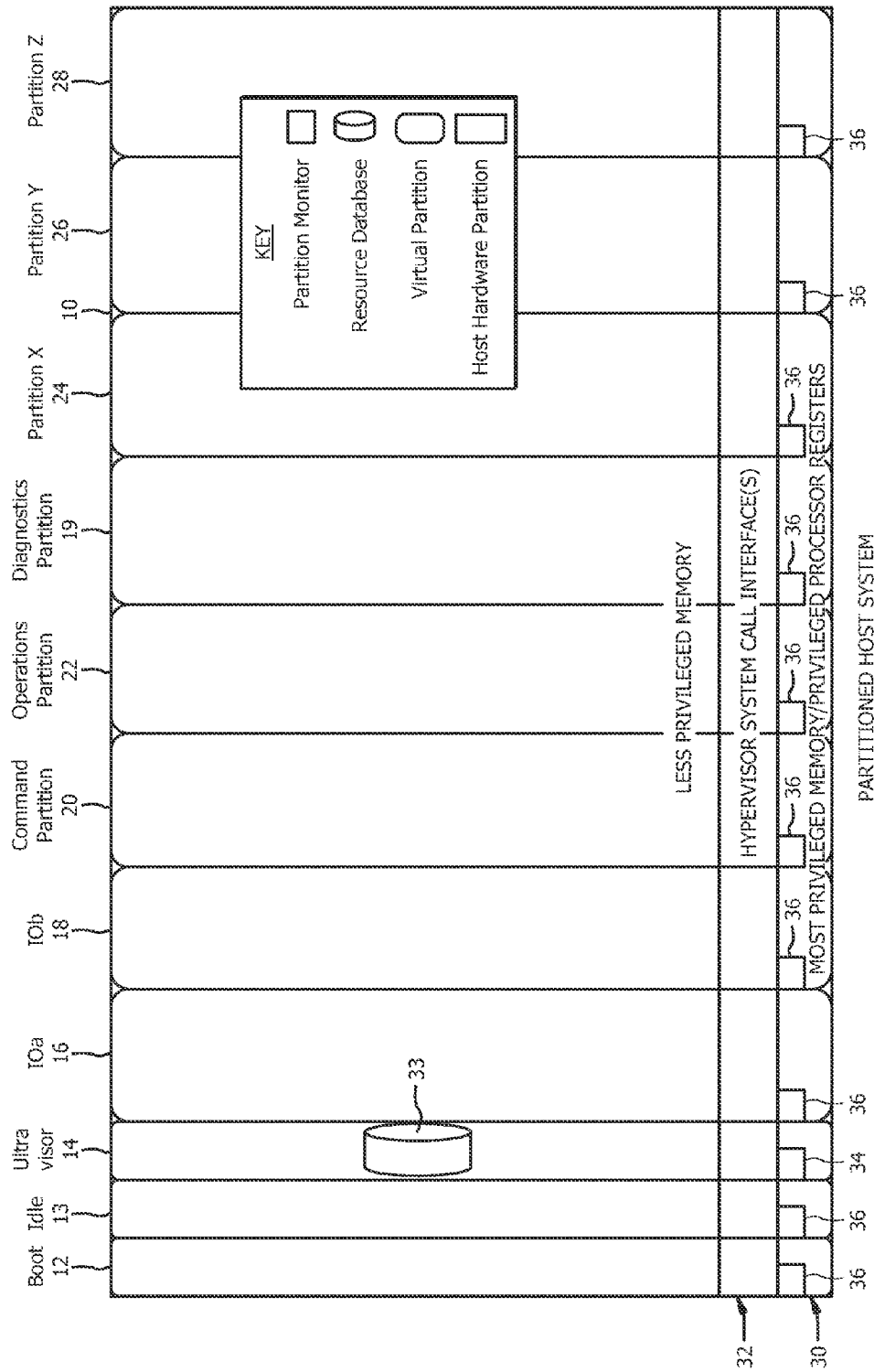
FIG. 2 is a schematic view of the host system of FIG. 1, illustrating the partitioned host system of FIG. 1 and the associated partition monitors of each partition, according to an embodiment.
Figure 3:
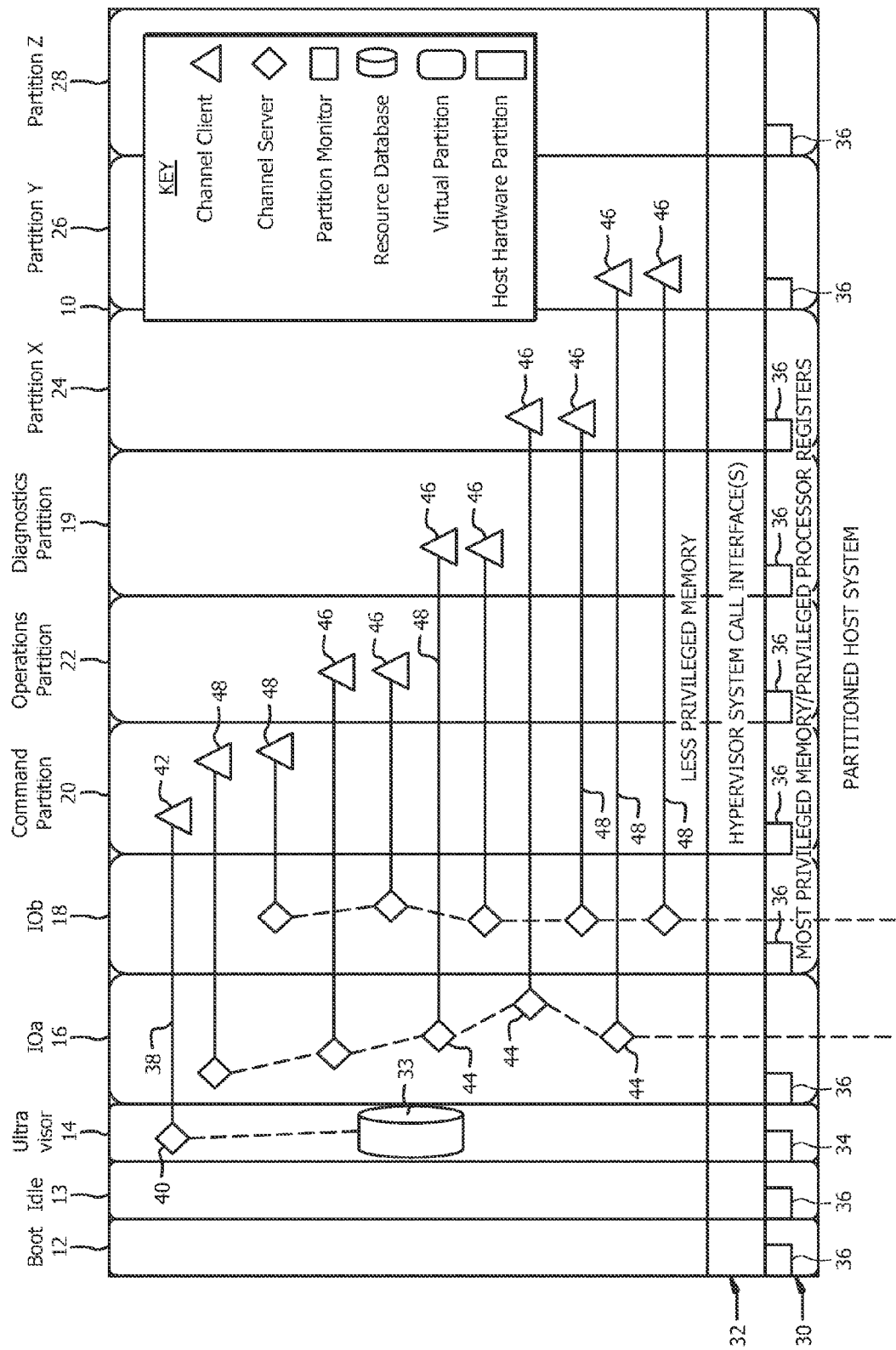
FIG. 3 is a schematic view of the host system of FIG. 1, illustrating memory mapped communication channels amongst various partitions of the para-virtualization system of FIG. 1, according to an embodiment.

The resource manager application of the ultravisor partition 14, shown as application 40 in FIG. 3, manages a resource database 33 that keeps track of the assignment of resources to partitions, and further serves a command channel 38 to accept transactional requests for assignment of the resources to respective partitions. As illustrated in FIG. 2, the ultravisor partition 14 also includes a partition (lead) monitor 34 that is similar to a virtual machine monitor (VMM), except that the partition monitor 34 provides individual read-only views of the resource database 33 in the ultravisor partition 14 to associated partition monitors 36 of each partition. Thus, unlike conventional VMMs, each partition has its own monitor instance 36 such that failure of the monitor 36 does not bring down the entire host partitioned system 10.

As will be explained below, the guest operating systems in the respective virtual guest partitions 24, 26, 28 can be modified to access the associated partition monitors 36 that implement together with the hypervisor system call interface 32 a communications mechanism through which the ultravisor partition 14, the IOVM partitions 16 and 18, and any other special infrastructure partitions may initiate communications with each other and with the respective virtual guest partitions. However, to implement this functionality, those skilled in the art will appreciate that the guest operating systems in the virtual guest partitions 24, 26, 28 can be modified so that the guest operating systems do not attempt to use the "broken" instructions in the x86 system that complete virtualization systems must resolve by inserting traps.

Basically, the approximately 17 "sensitive" IA-32 instructions (those that are not privileged but that yield information about the privilege level or other information about actual hardware usage that differs from that expected by a guest OS) are defined as "undefined," and any attempt to run an unaware OS at other than ring zero likely will cause the OS to fail but will not jeopardize other partitions. Such "paravirtualization" requires modification of a relatively few lines of operating system code while significantly increasing system security by removing many opportunities for hacking into the kernel via the "broken" ("sensitive") instructions. Those skilled in the art will appreciate that the partition monitors 36 could instead implement a "scan and fix" operation whereby runtime intervention is used to provide an emulated value rather than the actual value by locating the sensitive instructions and inserting the appropriate interventions.

The partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36, which allows the support of multiple system call interfaces 32 and for these standards to evolve over time. Different partitions using different monitors 36 also allows the independent upgrade of monitor components in different partitions.

The monitor 36 preferably is aware of processor capabilities so that the monitor 36 may be optimized to use any available processor virtualization support. With appropriate monitor 36 and processor support, a guest OS in a virtual guest partition (e.g., virtual guest partitions 24-28) need not be aware of the ultravisor system of the invention and need not make any explicit "system" calls to the monitor 36. In this case, processor virtualization interrupts provide the necessary and sufficient system call interface 32. However, to improve performance, explicit calls from a guest OS to a monitor system call interface 32 still are desirable.

The monitor 36 also maintains a map of resources allocated to the partition it monitors, and ensures that the guest OS (and applications) in its partition use only the allocated hardware resources. The monitor 36 can do this because the monitor 36 is the first code running in the partition at the processor's most privileged level. The monitor 36 boots the partition firmware at a decreased privilege. The firmware subsequently boots the OS and applications. Normal processor protection mechanisms prevent the firmware, the OS, and the applications from obtaining the processor's most privileged protection level.

Unlike a conventional VMM, the monitor 36 has no I/O interfaces. All I/O operations are performed by I/O hardware mapped to the IOVM partitions 16 and 18, which use memory channels to communicate with their client partitions. Instead, the primary responsibility of the monitor 36 is to protect processor provided resources (e.g., processor privileged functions and memory management units). The monitor 36 also protects access to I/O hardware primarily through protection of memory mapped I/O operations. The monitor 36 further provides channel endpoint capabilities, which are the basis for I/O capabilities between virtual guest partitions.

The monitor 34 for the ultravisor partition 14 is a "lead" monitor with two special roles. First, the monitor 34 creates and destroys monitor instances 36. Second, the monitor 34 provides services to the created monitor instances 36 to aid processor context switches. During a processor context switch, the monitors 34 and monitor instances 36 save the virtual guest partition state in the virtual processor structure, save the privileged state in the virtual processor structure (e.g. IDTR, GDTR, LDTR, CR3), and then invoke the ultravisor monitor switch service. The ultravisor monitor switch service loads the privileged state of the target partition monitor (e.g., IDTR, GDTR, LDTR, CR3) and switches to the target partition monitor, which then restores the remainder of the virtual guest partition state.

The most privileged processor level (i.e., x86 ring 0) is retained by having the monitor instance 36 running below the system call interface 32. This retention is more effective if the processor implements at least three distinct protection levels (e.g., x86 ring 1, 2, and 3) available to the guest OS and applications. The x86 processor virtualization (as described hereinabove) provides x86 root rings 0-3 for the monitor use, allowing the guest to use all four of the non-root rings 0-3. The ultravisor partition 14 connects to the monitors 34 and monitor instances 36 at the base (most privileged level) of each partition. The monitor 34 grants itself read only access to the partition descriptor in the ultravisor partition 14, and the ultravisor partition 14 has read only access to one page of the monitor state stored in the resource database 33.

Those skilled in the art will appreciate that the monitors 34 and monitor instances 36 of the invention are similar to a conventional VMM in that they constrain the partition to its assigned resources, the interrupt handlers provide protection exceptions that emulate privileged behaviors as necessary, and system call interfaces are implemented for "aware" contained system code. However, as explained in further detail below, the monitors 34 and monitor instances 36 of the invention are unlike a conventional VMM in that the master resource database 33 is contained in a virtual (ultravisor) partition for recoverability, the resource database 33 implements a simple transaction mechanism, and the virtualized system is constructed from a collection of cooperating monitors 34 and monitor instances 36 whereby a failure in one monitor 34 or monitor instance 36 need not doom all partitions (only containment failure that leaks out does). As such, as discussed below, failure of a single physical processing unit need not doom all partitions of a system, because partitions are affiliated with different processing units.

The monitors 34 and monitor instances 36 of the invention are also different from conventional VMMs in that each partition is contained by its assigned monitor, partitions with simpler containment requirements can use simpler and thus more reliable (and higher security) monitor implementations, and the monitor implementations for different partitions may, but need not be, shared. Also, unlike conventional VMMs, the lead monitor 34 provides access by other monitor instances 36 to the ultravisor partition resource database 33.

Partitions in the ultravisor environment include the available resources organized by the host node 10. A partition is a software construct (that may be partially hardware assisted) that allows a hardware system platform (or hardware partition) to be "partitioned" into independent operating environments. The degree of hardware assist is platform dependent but, by definition, is less than 100% (because, by definition, a 100% hardware assist provides hardware partitions). The hardware assist may be provided by the processor or other platform hardware features. From the perspective of the ultravisor partition 14, a hardware partition generally is indistinguishable from a commodity hardware platform without partitioning hardware.

Unused physical processors are assigned to a special "idle" partition 13. The idle partition 13 is the simplest partition that is assigned processor resources. The idle partition 13 contains a virtual processor for each available physical processor, and each virtual processor executes an idle loop that contains appropriate processor instructions to reduce processor power usage. The idle virtual processors may cede time at the next ultravisor time quantum interrupt, and the monitor 36 of the idle partition 13 may switch processor context to a virtual processor in a different partition. During host bootstrap, the boot processor of the boot partition 12 boots all of the other processors into the idle partition 13.

In some embodiments, multiple ultravisor partitions 14 also are possible for large host partitions, to avoid a single point of failure. Each ultravisor partition 14 would be responsible for resources of the appropriate portion of the host system 10. Resource service allocations would be partitioned in each portion of the host system 10. This allows clusters to run within a host system 10 (one cluster node in each zone), and still survive failure of an ultravisor partition 14.

As illustrated in FIGS. 1-3, each page of memory in an ultravisor enabled host system 10 is owned by one of its partitions. Additionally, each hardware I/O device is mapped to one of the designated IOVM partitions 16, 18. These IOVM partitions 16, 18 (typically two for redundancy) run special software that allows the IOVM partitions 16, 18 to run the I/O channel server applications for sharing the I/O hardware. Alternatively, for IOVM partitions executing using a processor implementing Intel's VT-d technology, devices can be assigned directly to non-IOVM partitions. Irrespective of the manner of association, such channel server applications include a virtual Ethernet switch (which provides channel server endpoints for network channels) and a virtual storage switch (which provides channel server endpoints for storage channels). Unused memory and I/O resources are owned by a special "available" pseudo partition (not shown in the figures). One such "available" pseudo partition per node of host system 10 owns all resources available for allocation.

Referring to FIG. 3, virtual channels are the mechanisms used in accordance with the invention to connect to zones and to provide relatively fast, safe, recoverable communications among the partitions. For example, virtual channels provide a mechanism for general I/O and special purpose cent/server data communication between the virtual guest partitions 24, 26, 28 and the IOVM partitions 16, 18 in the same host 10. Each virtual channel provides a command and I/O queue (e.g., a page of shared memory) between two partitions. The memory for a channel is allocated and "owned" by the virtual guest partition 24, 26, 28. The ultravisor partition 14 maps the channel portion of client memory into the virtual memory space of the attached server partition. The ultravisor application tracks channels with active servers to protect memory during teardown of the owner virtual guest partition until after the server partition is disconnected from each channel. Virtual channels can be used for command, control, and boot mechanisms, as well as for traditional network and storage I/O.

As shown in FIG. 3, the ultravisor partition 14 has a channel server 40 that communicates with a channel client 42 of the command partition 20 to create the command channel 38. The IOVM partitions 16, 18 also include channel servers 44 for each of the virtual devices accessible by channel clients 46. Within each virtual guest partition 24, 26, 28, a channel bus driver enumerates the virtual devices, where each virtual device is a client of a virtual channel. The dotted lines in IOVMa partition 16 represent the interconnects of memory channels from the command partition 20 and operations partitions 22 to the virtual Ethernet switch in the IOVMa partition 16 that may also provide a physical connection to the appropriate network zone. The dotted lines in IOVMb partition 18 represent the interconnections to a virtual storage switch. Redundant connections to the virtual Ethernet switch and virtual storage switches are not shown in FIG. 3. A dotted line in the ultravisor partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices, as well as runtime only devices. Except for the IOVM virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices. Virtual device drivers also may be used to access shared memory devices and to create a shared memory interconnect between two or more virtual guest partitions. The device drivers convert device requests into channel commands appropriate for the virtual device type.

In the case of a multi-processor host 10, all memory channels 48 are served by other virtual partitions. This helps to reduce the size and complexity of the hypervisor system call interface 32. For example, a context switch is not required between the channel client 46 and the channel server 44 of the IOVM partition 16 because the virtual partition serving the channels typically is active on a dedicated physical processor.

Additional details regarding possible implementations of an ultravisor arrangement are discussed in U.S. Pat. No. 7,984,104, assigned to Unisys Corporation of Blue Bell, Pa., the disclosure of which is hereby incorporated by reference in its entirety.

According to a further embodiment, for enhanced security, an embedded version of the secure partition tool and architecture described hereinabove (generally referred to as secure-partition, or s-Par) is described hereinbelow. As described hereinabove, the s-Par secure partition architecture includes a virtualization boot ("ultraboot") application and a number of service partitions. The ultraboot application, which is a Unified Extensible Firmware Interface (UEFI) application, is responsible for bootstrapping the secure partition tool. The Unified Extensible Firmware Interface is an interface between an operating system and platform firmware.

Figure 4A:
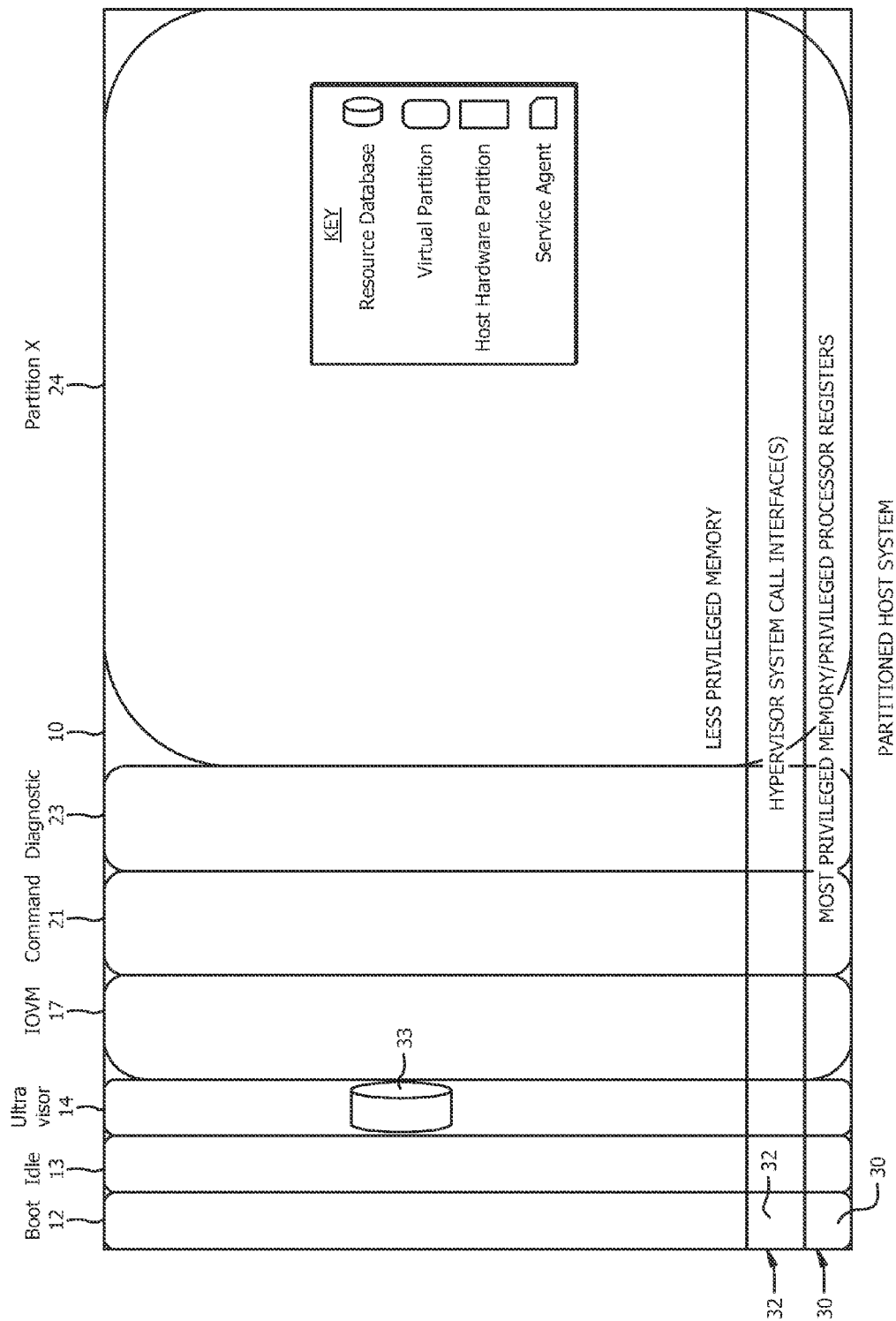
FIG. 4*a* is a schematic view of a host system partitioned using a reduced service partition configuration or architecture, according to an embodiment.

According to a further embodiment, the service partitions are reduced to only those partitions that are needed for basic operations, such as the command partition, the I/O partition(s), and a diagnostic partition. FIG. 4a is a schematic view of a host system 10 partitioned using such reduced service partition configuration or architecture, according to an embodiment. As shown, the host system 10 includes a boot partition 11 and a reduced number of service partitions, such as an IOVM partition 17, a command partition 21 and a diagnostic partition 23. The host system 10 also can include one or more guest partitions, such as the guest partition X 24.

Figure 4B:
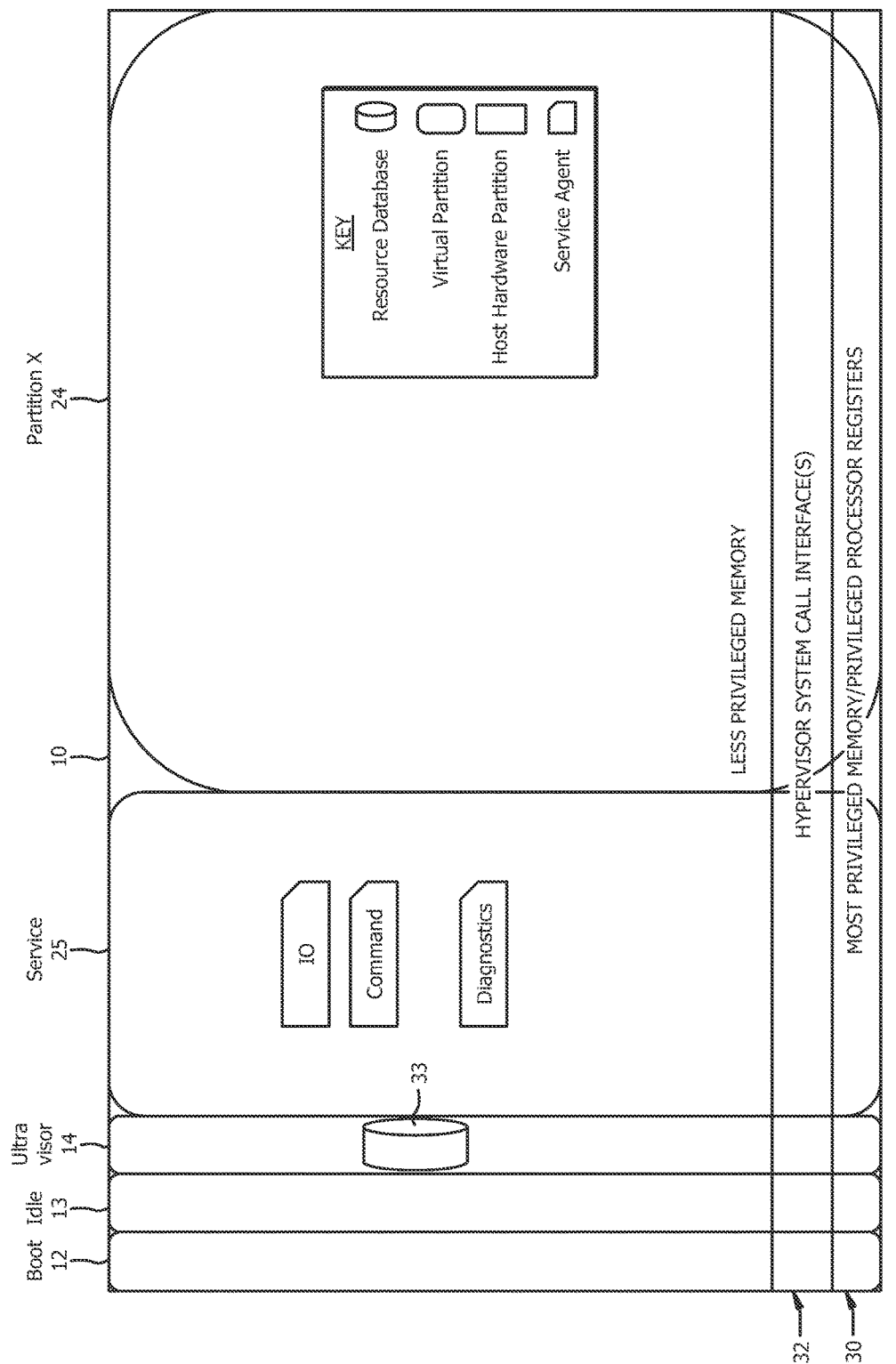
FIG. 4*b* is a schematic view of a host system partitioned using an alternative reduced service partition configuration or architecture, according to an embodiment.

Also, according to a further embodiment, the functionality of these reduced service partitions occupies or is moved into a single service partition. FIG. 4b is a schematic view of a host system 10 partitioned using an alternative reduced service partition configuration or architecture, in which the functionality of the reduced service partitions occupies or is moved into a single service partition 25.

The basic structure of this reduced service partition configuration or architecture (which can be referred to as s-Par Lite) involves a relatively small UEFI application (the ultraboot application) and a single service partition based on embedded Linux or other appropriate operating system.

One purpose of this reduced service partition architecture or configuration is to bring a relatively simplified and more accessible version of the secure partition architecture to computing devices and systems that meet the appropriate requirements needed to support and operate the secure partition architecture. The reduced service partition architecture generally can be considered virtualization for the sake of security, as well as convenience. The reduced service partition architecture allows for a downloadable version of the secure partition architecture that is booted directly from the UEFI firmware of the computing device or system.

Also, because the reduced service partition architecture has a smaller footprint than a conventional secure partition architecture, the reduced service partition architecture can be loaded directly from the flash memory of a computing device. Therefore, instead of the computing device booting the reduced service partition architecture (as with a conventional secure partition architecture), the computing device actually contains the reduced service partition architecture as part of its firmware, and executes the reduced service partition architecture as part of the boot sequence of the computing device. Also, as will be discussed hereinbelow, the reduced service partition architecture can be stored on and loaded from a data storage disk or device of the computing device.

According to an embodiment, the reduced service partition architecture requires no separation between the computing device and the reduced service partition architecture. The reduced service partition architecture is embedded in the firmware of the computing device, and therefore makes the computing device appear to an end user as a set of resources that can be assigned to various operating systems. The reduced service partition architecture also allows for a relatively greater level of security, by using an UEFI secure boot to guarantee that the firmware of the computing device, and the reduced service partition architecture as one of its components, are not compromised.

In general, the reduced service partition architecture is an embedded version of the secure partition architecture. The secure partition architecture and design facilitates the ability to implement the reduced service partition architecture. As discussed hereinabove, the core mission of the secure partition architecture is to create and maintain isolated secure partitions. Isolated secure partitions are achieved by providing a Trusted Computing Base (TCB). The TCB contains all of the elements of the system responsible for supporting the security policy and supporting the isolation of objects (code and data) on which the protection is based. The TCB can be divided into two basic categories, based on whether the TCB executes in root mode or executes in non-root mode.

There are two code components that execute in VT-x root mode. The monitor component, which includes VMM handlers, is associated with a secure partition. The context switch component is associated with a (physical) logical processor.

The monitor assists the VT-x hardware in enforcing the isolation policy. The VMM handlers provide minimal emulation of "legacy" traditional computing device architecture, e.g., advanced programmable interrupt controller (APIC), input/output APIC (IOAPIC), peripheral interface controller (PIC), real-time controller (RTC), programmable interval timer (PIT), advanced configuration and power interface (ACPI) fixed registers, and the COM2 debug output port.

The context switch and VT-x boot (VMXON) for logical-processors (logical processor cores) enables the sharing of logical processors by the secure partition architecture service partitions. The context switch component also enables a control service to perform housekeeping (create/start/halt) of virtual processors in the context of the logical-processor. The context switch component also enables Intel HLT op-code to put unassigned or inactive logical-processors into an ACPI C1 suspended state.

With respect to the TCB executing in a non-root mode, there are several non-root mode code system elements. The ultravisor services are implementations, e.g., C language implementations, that rely only on shared memory. The control service maintains the isolation policy (e.g., processor cores, memory segments/sections, DIRECT devices). The idle service provides for a secure scrub of physical memory devices. The logger and diagnostic service provides secure diagnostic logs for TCB, service and virtual guest components. The ACPI service, which is not a core part of the TCB, provides access to securely enumerate PCI I/O devices (and eventually host the ACPICA AML interpreter).

According to an embodiment, the entire reduced service partition TCB is loaded and booted via the UEFI driver ultraboot.efi. In this manner, the reduced service partition architecture is placed in the UEFI firmware of the computing device and execution is started from the moment the UEFI firmware loads the driver.

FIG. 5a is a schematic view of a computing device 50, in which the reduced service partition architecture is stored in the UEFI firmware of the computing device, according to an embodiment. The computing device 50 includes a computer 52, which includes various computing components, such as one or more processors, an operating system, firmware and various hardware devices. The computing device 50 also includes UEFI firmware 54, which typically is coupled between the operating system and the firmware of the computing device 50. The computing device 50 also can include one or more Universal Serial Bus (USB) Flash Drive (UFD) devices 55. The computing device 50 also can include one or more data storage disks or other data storage devices 56.

According to an embodiment, the reduced service partition architecture, shown generally as s-Par Lite 58, is stored in the UEFI firmware 54 of the computing device 50. Alternatively, as shown in FIG. 5b, the reduced service partition architecture 58 is stored in the UFD device 55 of the computing device 50. Alternatively, as shown in FIG. 5c, the reduced service partition architecture 58 is stored in the data storage disk 56 of the computing device 50. As discussed hereinabove, the relatively small footprint of the reduced service partition architecture 58 allows the reduced service partition architecture 58 to be stored on and loaded directly from the UEFI firmware 54, the UFD device 55, or the data storage disk 56 of the computing device 50.

Figure 6:
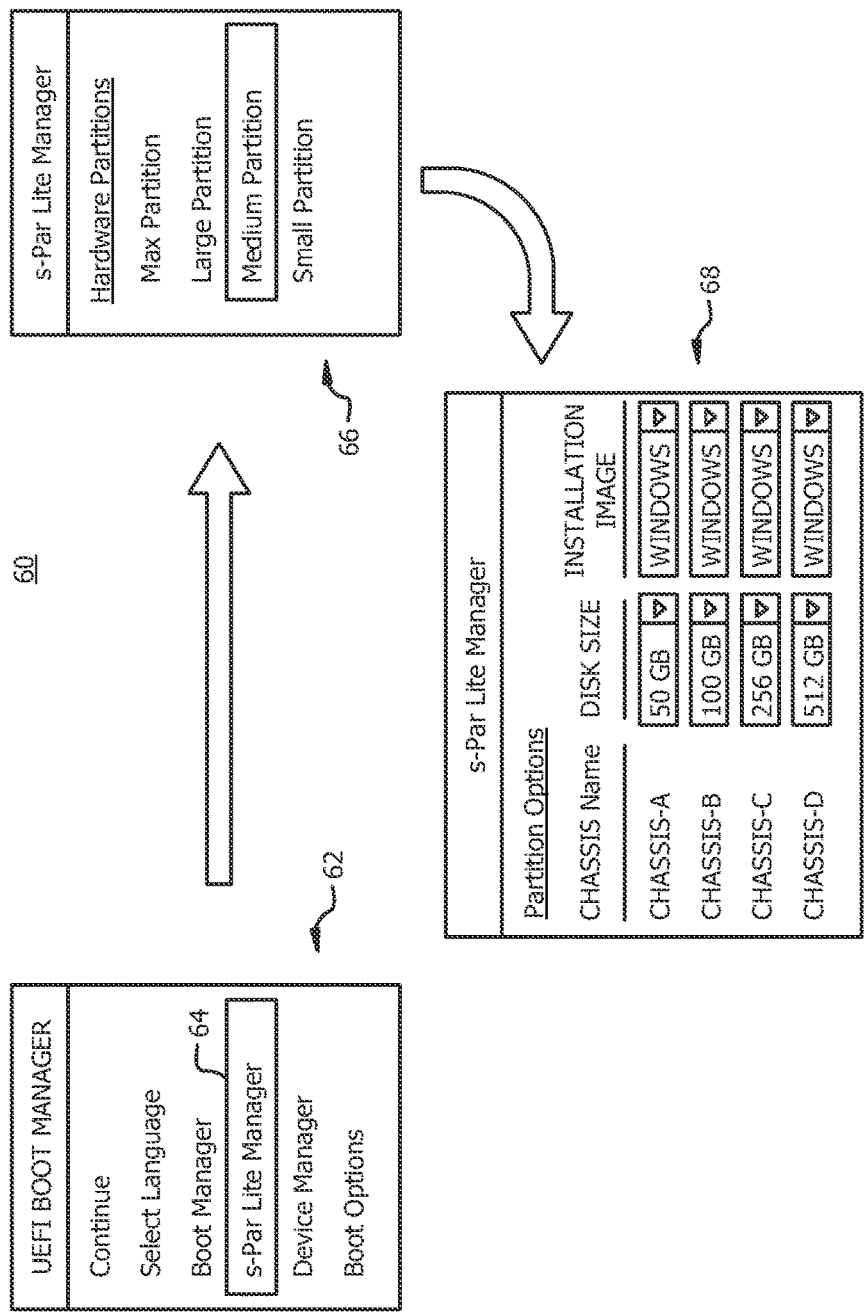
FIG. 6 is a schematic view of various UEFI firmware set-up screens for partitioning a computing device, according to an embodiment.

FIG. 6 is a schematic view 60 of various UEFI firmware set-up screens for partitioning a computing device, according to an embodiment. The ability to store the reduced service partition architecture in the UEFI firmware of a computing device, as shown in FIG. 5b, provides the user of the computing device with choices of how to partition the computing device from the moment the user turns on the computing device.

A main UEFI firmware set-up screen 62 provides the user with various set-up choices, including a Select Language option, a Boot Manager option, a Device Manager option, and a Boot option. With the reduced service partition architecture loaded in the UEFI firmware of the a computing device, the main UEFI firmware set-up screen 62 also includes an additional option (s-Par Lite Manager 64) to partition the computer resources between different operating systems.

Upon selecting the s-Par Lite Manager option 64 from the main UEFI firmware set-up screen 62, the user is presented with an s-Par Lite Manager set-up screen 66, which allows the user to select the size of the hardware partition(s). For example, the user is provided with various options: 1 maximum partition, 2 large partitions, 4 medium partitions, or 8 small partitions. It should be understood that other partition options can be made available via the s-Par Lite Manager set-up screen 66. Upon selecting the size of the hardware partition(s) from the s-Par Lite Manager set-up screen 66, the user is presented with another s-Par Lite Manager set-up screen 68, which allows the user to select from various partition options with regard to the disk size and the installation image for each virtual guest partition (chassis).

One or more of the main UEFI firmware set-up screen 62 and the s-Par Lite Manager set-up screens 66, 68 also can provide an option for the user to disable the reduced service partition architecture. Also, such disabling option can be made unavailable for security reasons.

According to an embodiment, there are a number of options as to how the reduced service partition architecture can be set up to execute within the computing device. The number of options and the type of options available typically is dependent on the availability of various hardware resources in the computing device. For example, setup options can include an IOVM service partition option, a hybrid IOVM and direct hardware access option, an option in which all resources are directly assigned to virtual guest partitions, and a hybrid disk image and dual boot option. It should be understood that other reduced service partition architecture options are available for execution within the computing device.

Figure 7:
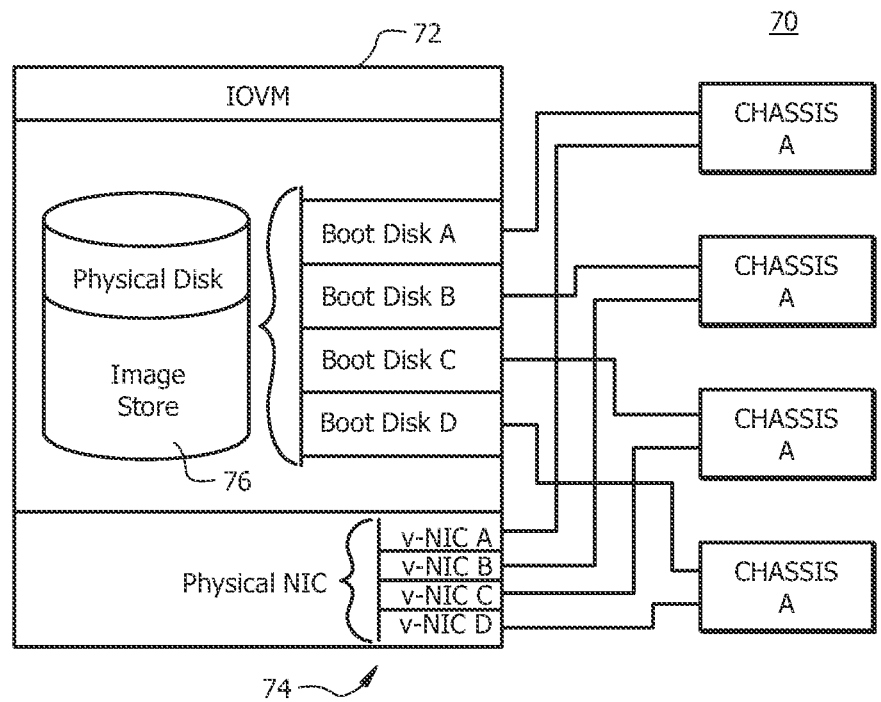
FIG. 7 is a schematic view of an IOVM service partition option for setting up the reduced service partition architecture in a computing device, according to an embodiment.

FIG. 7 is a schematic view of an IOVM service partition option 70 for setting up the reduced service partition architecture in a computing device, according to an embodiment. With this option, all of the processors and memory are divided between secure partitions. However, the data storage disk and the network cards are assigned to the IOVM secure service partition 72. Virtual network interface controller (NIC) cards 74, e.g., NIC cards A-D, are shared, i.e., given, to different virtual guest partitions (shown as chassis A, chassis B, chassis C and chassis D). Therefore, in this service partition option, the resources are shared but the resources use the same memory.

Figure 8:
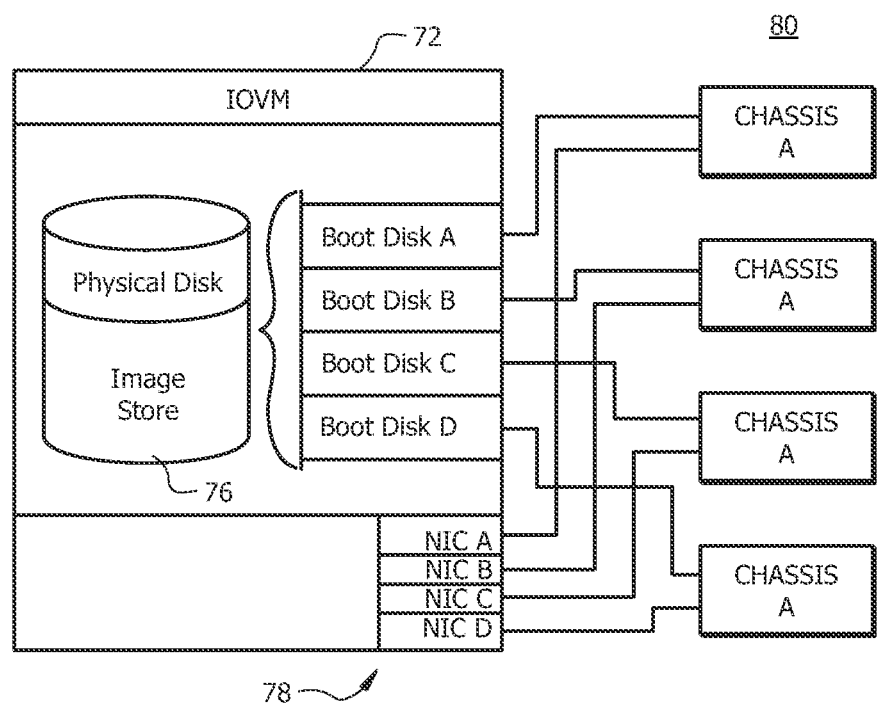
FIG. 8 is a schematic view of a hybrid IOVM and direct hardware access option for setting up the reduced service partition architecture in a computing device, according to an embodiment.

FIG. 8 is a schematic view of a hybrid IOVM and direct hardware access option 80 for setting up the reduced service partition architecture in a computing device, according to an embodiment. The hybrid IOVM and direct hardware access option 80 is similar to the IOWA service partition option 70 shown in FIG. 7, except that either the data storage disk or the network cards are given or assigned to the IOVM secure service partition 72. For example, if the computing device has two network cards and a single data storage disk, the data storage disk is assigned to the IOVM secure service partition 72, and the disk images 76 residing on the data storage disk are used as virtual disks for the virtual guest partitions (chassis A-D), while each of the NIC cards 78 are assigned directly to the virtual guest partitions (chassis A-D).

Figure 9:
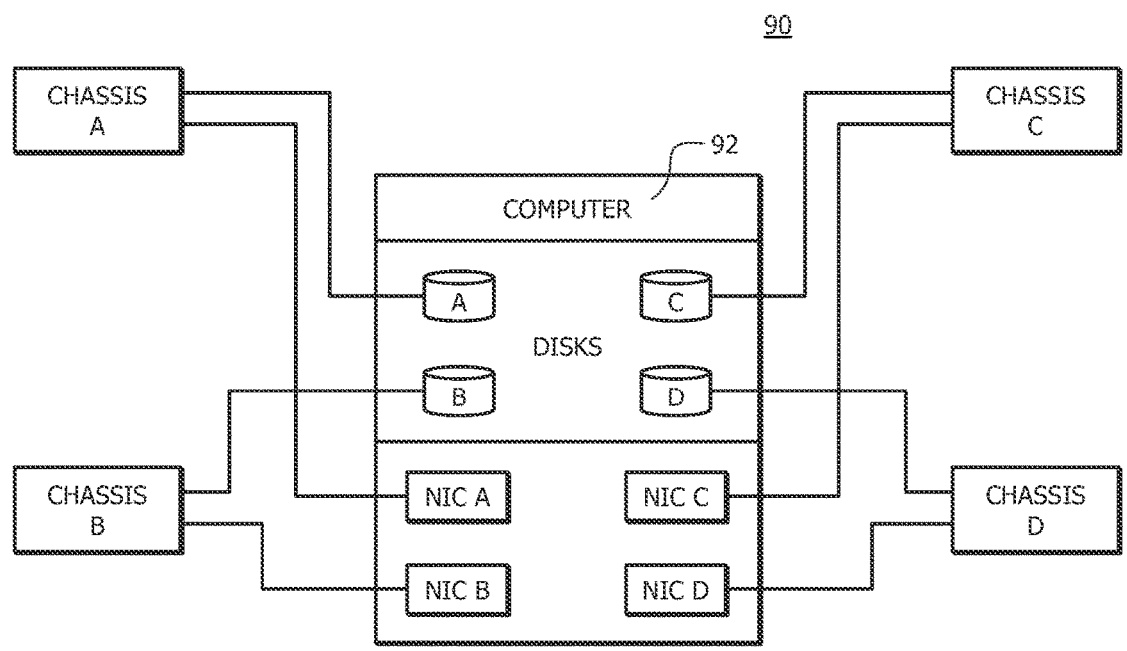
FIG. 9 is a schematic view of an option for setting up the reduced service partition architecture in a computing device, in which all resources are directly assigned to virtual guest partitions, according to an embodiment.

FIG. 9 is a schematic view of an option 90 for setting up the reduced service partition architecture in a computing device, in which all resources are directly assigned to virtual guest partitions, according to an embodiment. According to this setup option, the computing device 92 has enough resources (e.g., data storage disks and NICs) to assign them directly to each virtual guest partition (chassis A-D).

Figure 10:
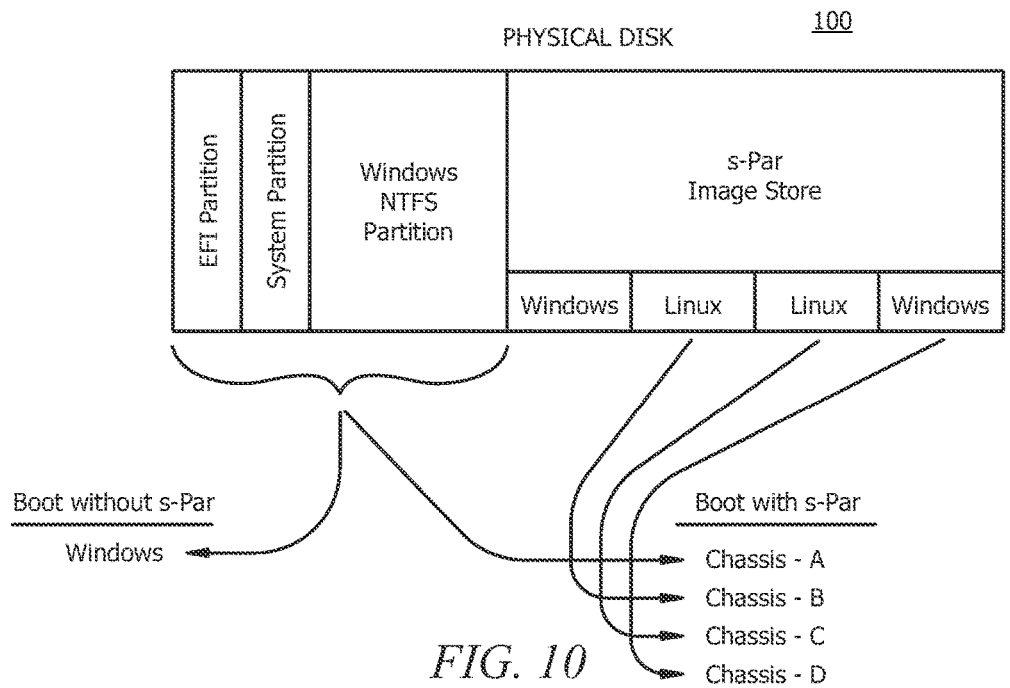
FIG. 10 is a schematic view of a hybrid disk image and dual boot option for setting up the reduced service partition architecture in a computing device, according to an embodiment.

FIG. 10 is a schematic view of a hybrid disk image and dual boot option 100 for setting up the reduced service partition architecture in a computing device, according to an embodiment. Having the option of disabling the reduced service partition architecture and booting the computer in legacy mode (i.e., without partitioning) allows for an option of a dual boot (between an operating system and the secure partition architecture). When the computing device is installed in this dual boot mode, the operating system is given direct access to the data storage disk, but the operating system is not allowed to use all of the capacity of the data storage disk. The last partition on the data storage disk is reserved for the service partition architecture to store disk images for the virtual guest partitions. When booting with the reduced service partition architecture, it is possible to assign the existing operating system from the data storage disk directly to the virtual guest partitions, in addition to the virtual guest partitions using disk images.

Figure 11:
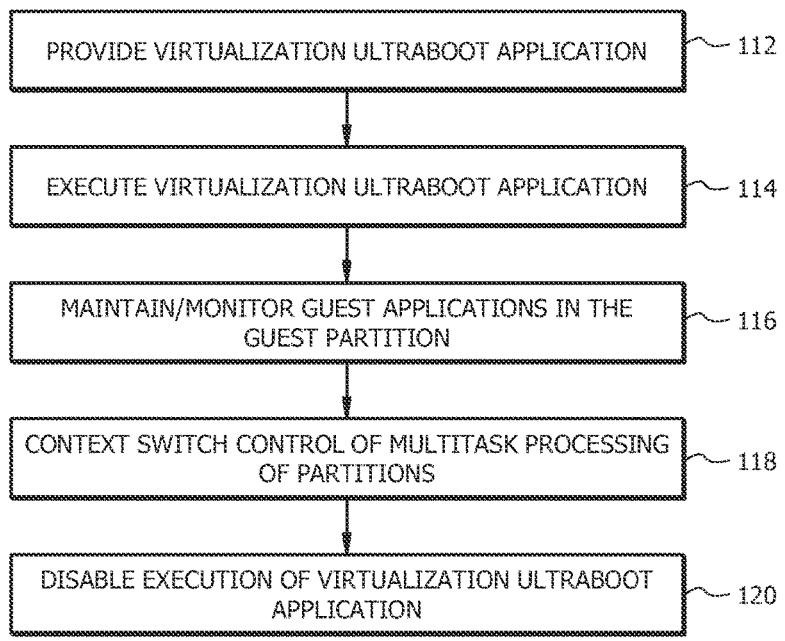
FIG. 11 is a flow diagram of a virtualization method for a host system, using a reduced service partition configuration or architecture, according to an embodiment.

FIG. 11 is a flow diagram of a virtualization method 110 for a host system, using a reduced service partition configuration or architecture, according to an embodiment. The method 110 includes providing an ultraboot application (shown as 112). As discussed hereinabove, the ultraboot application is a UEFI application that is part of the firmware of the computing device.

The method 110 also includes executing the ultraboot application (shown as 114). As discussed hereinabove, the ultraboot application is responsible for bootstrapping the secure partition tool, including the reduced service partition configuration or architecture. The ultraboot application divides the hosting computing device into at least one virtual service partition (and at least one virtual guest partition).

The method 110 also includes maintaining guest applications in the virtual guest partitions) (shown as 116). As discussed hereinabove, a monitor that operates in the most privileged system memory maintains guest applications in the virtual guest partition(s).

The method 110 also includes controlling multitask processing in the partitions (shown as 118). As discussed hereinabove, a context switch between the monitor and the virtual guest partitions controls the multitask processing in the partitions of the computing device.

The method 110 also includes disabling the execution of the ultraboot application (shown as 120). As discussed hereinabove, a user of the computing device can be provided with the option of disabling the ultraboot application. Disabling the ultraboot application can be performed for security reasons. Also, having the option of disabling the ultraboot application allows for a dual boot option for the computing device.

One of ordinary skill in the art will appreciate that any process or method descriptions herein may represent modules, segments, logic or portions of code which include one or more executable instructions for implementing logical functions or steps in the process. It should be further appreciated that any logical functions may be executed out of order from that described, including substantially concurrently or in reverse order, depending on the functionality involved, as would be understood by those reasonably skilled in the art. Furthermore, the modules may be embodied in any non-transitory computer readable medium for use by or in connection with an instruction execution system, apparatus, or device, such as a computer-based system, processor-containing system, or other system that can fetch the instructions from the instruction execution system, apparatus, or device and execute the instructions.

It will be apparent to those skilled in the art that many changes and substitutions can be made to the embodiments described herein without departing from the spirit and scope of the disclosure as defined by the appended claims and their full scope of equivalents.

The invention claimed is:

1. A virtualization system for a host computing device having at least one host processor and system resources including memory divided into most privileged system memory and less privileged user memory, the system comprising:
   a virtualization boot application that operates in the less privileged user memory and divides the host computing device into a resource management partition, at least one virtual service partition and at least one virtual guest partition, the at least one virtual guest partition providing a virtualization environment for at least one guest operating system, the virtual service partition providing a virtualization environment for the basic operations of the virtualization system, and the resource management partition maintaining a resource database for use in managing the use of the at least one host processor and the system resources;
   an ultravisor partition that operates in the most privileged system memory to create and destroy at least one monitor instance and to provide services to the at least one monitor instances during context switches of partitions;
   at least one monitor instances and maintains guest applications in the at least one virtual guest partition within memory space allocated by the virtual service partition to the at least one virtual guest partition; and
   a context switch between the at least one monitor and the respective virtual guest partitions and the virtual service partition for controlling multitask processing in the partitions on the at least one host processor, during a context switch, the ultravisor partition and the at least one monitor instance save a current virtual guest partition state in a virtual processor structure, save a current privilege state in virtual processor structure, and invokes a ultravisor monitor switch service;
   wherein the host computing device includes Unified Extensible Firmware Interface (UEFI) firmware, and wherein the virtualization boot application is embedded in the UEFI firmware of the host computing device;
   wherein the ultravisor monitor switch service loads the privileged state of the target partition monitor and switches to the target partition monitor, which then restores the remainder of the virtual guest partition state; and
   wherein the virtual service partitions comprises a command partition, an Input/Output partition, and a diagnostic partition and is stored within the UEFI firmware of the host computing device.

2. The system as recited in claim 1, wherein the virtual service partition includes the functionality of a command partition, an input/output virtual machine (IOVM) partition and a diagnostics partition.

3. The system as recited in claim 1, wherein the virtualization boot application is booted directly from the UEFI firmware.

4. The system as recited in claim 1, wherein the virtualization boot application is loaded directly from a flash memory portion of the UEFI firmware.

5. The system as recited in claim 1, wherein the virtualization boot application is executed as part of the boot sequence of the host computing device.

6. The system as recited in claim 1, wherein the virtualization boot application allows the host computing device to be partitioned when the host computing device is turned on and booted.

7. The system as recited in claim 1, wherein the host computing device includes at least one data storage disk, and wherein the virtualization boot application is an embedded application stored in the at least one data storage disk.

8. The system as recited in claim 1, wherein the host computing device includes a plurality of processors, at least one data storage device, and a plurality of network interface controller (NIC) cards, and wherein the host computing device is partitioned in such a way that the memory space and the plurality of processors each are divided between the virtual guest partitions and the NIC cards are divided between the virtual guest partitions, but the data storage device and the network cards are assigned to the virtual service partition.

9. The system as recited in claim 1, wherein the host computing device includes a plurality of processors, at least one data storage device, and a plurality of network interface controller (NIC) cards, and wherein the host computing device is partitioned in such a way that the memory space and the plurality of processors each are divided between the virtual guest partitions and the NIC cards are divided between the virtual guest partitions, but either the data storage device or the network cards are assigned to the virtual service partition while the other is assigned directly to the virtual guest partitions.

10. The system as recited in claim 1, wherein the host computing device includes a plurality of processors, at least one data storage device, and a plurality of network interface controller (NIC) cards, and wherein the host computing device is partitioned in such a way that the memory space, the plurality of processors, the data storage devices and the NIC cards each are divided between the virtual guest partitions.

11. The system as recited in claim 1, wherein the computing device includes an operating system and at least one data storage device, and wherein the computing device operates in a dual boot mode whereby the operating system is given direct access to a portion of the data storage and the remaining portion of the data storage device is reserved for disk images of the virtual guest partitions.

12. A virtualization method for a host computing device having at least one host processor and system resources including memory divided into most privileged system memory and less privileged user memory, the method comprising:
   providing a virtualization boot application that operates in the less privileged user memory and divides the host computing device into a resource management partition, at least one virtual service partition and at least one virtual guest partition, executing the virtualization boot application to divide the host computing device into at least one virtual service partition and at least one virtual guest partition, the at least one virtual guest partition providing a virtualization environment for at least one guest operating system, the virtual service partition providing a virtualization environment for the basic operations of the virtualization system, and the resource management partition maintaining a resource database for use in managing the use of the at least one host processor and the system resources;

maintaining, by a monitor in the most privileged system memory, guest applications in the at least one virtual guest partition within memory space allocated by the virtual service partition to the at least one virtual guest partition; and controlling multitask processing in the partitions on the at least one host processor by a context switch between the at least one monitor and the respective virtual guest partitions and the virtual service partition;

wherein during a context switch, the ultravisor partition and the at least one monitor instance save a current virtual guest partition state in a virtual processor structure, save a current privilege state in virtual processor structure, and invokes a ultravisor monitor switch service; and wherein the host computing device includes Unified Extensible Firmware Interface (UEFI) firmware, and wherein providing the virtualization boot application comprises embedding the virtualization boot application in the UEFI firmware of the host computing device;

wherein the ultravisor monitor switch service loads the privileged state of the target partition monitor and switches to the target partition monitor, which then restores the remainder of the virtual guest partition state; and wherein the virtual service partitions comprises a command partition, an Input/Output partition, and a diagnostic partition and is stored within the UEFI firmware of the host computing device.

13. The method as recited in claim 12, wherein executing the virtualization boot application comprises booting the virtualization boot application directly from the UEFI firmware.

14. The method as recited in claim 12, wherein executing the virtualization boot application includes loading the virtualization boot application directly from a flash memory portion of the UEFI firmware.

15. The method as recited in claim 12, wherein executing the virtualization boot application comprises executing the virtualization boot application as part of the boot sequence of the host computing device.

16. The method as recited in claim 12, wherein the host computing device includes at least one data storage disk, and wherein providing the virtualization boot application comprises an embedded virtualization boot application stored in the at least one data storage disk.

17. The method as recited in claim 12, wherein executing the virtualization boot application includes selecting a size of at least one of the virtual service partition and the at least one virtual guest partition.

18. The method as recited in claim 12, wherein executing the virtualization boot application includes selecting a data storage disk size and an installation image for at least one virtual guest partition.

19. The method as recited in claim 12, further comprising disabling the execution of an ultraboot application.

20. The method as recited in claim 12, wherein the host computing device includes a plurality of processors, at least one data storage device, a plurality of network cards, and a plurality of network interface controller (NIC) cards, and wherein the virtualization boot application partitions the host computing device in such a way that the memory space and the plurality of processors each are divided between the virtual guest partitions and the NIC cards are divided between the virtual guest partitions, but the data storage device and the network cards are assigned to the virtual service partition.

21. The method as recited in claim 12, wherein the host computing device includes a plurality of processors, at least one data storage device, a plurality of network cards, and a plurality of network interface controller (NIC) cards, and wherein the virtualization boot application partitions the host computing device in such a way that the memory space and the plurality of processors each are divided between the virtual guest partitions and the NIC cards are divided between the virtual guest partitions, but either the data storage device or the network cards are assigned to the virtual service partition while the other is assigned directly to the virtual guest partitions.

22. The method as recited in claim 12, wherein the host computing device includes a plurality of processors, at least one data storage device, a plurality of network cards, and a plurality of network interface controller (NIC) cards, and wherein the virtualization boot application partitions the host computing device in such a way that the memory space, the plurality of processors, the data storage devices and the NIC cards each are divided between the virtual guest partitions.

23. The method as recited in claim 12, wherein the computing device includes an operating system and at least one data storage device, and wherein the computing device operates in a dual boot mode whereby the operating system is given direct access to a portion of the data storage and the remaining portion of the data storage device is reserved for disk images of the virtual guest partitions.

* * * * *